US007782823B2

(12) United States Patent
Lee et al.

(10) Patent No.: US 7,782,823 B2
(45) Date of Patent: Aug. 24, 2010

(54) APPARATUS FOR ALLOCATING RESOURCES IN DAMA SATELLITE COMMUNICATION SYSTEM AND METHOD THEREOF

(75) Inventors: Ki-Dong Lee, Daejeon (KR); Deock-Gil Oh, Daejeon (KR); Ho-Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1285 days.

(21) Appl. No.: 11/305,587

(22) Filed: Dec. 16, 2005

(65) Prior Publication Data

US 2006/0133314 A1    Jun. 22, 2006

(30) Foreign Application Priority Data

Dec. 17, 2004  (KR) ............. 10-2004-0107990
Jun. 17, 2005  (KR) ............. 10-2005-0052243

(51) Int. Cl.
*H04Q 7/00* (2006.01)
(52) U.S. Cl. ............... 370/337; 370/442; 370/468
(58) Field of Classification Search ......... 370/230–235, 370/252–253, 442, 458, 461, 468, 329, 336, 370/337
See application file for complete search history.

(56) References Cited

U.S. PATENT DOCUMENTS

| 5,790,535 A | 8/1998 | Kou |
| 5,995,805 A | 11/1999 | Ogasawara et al. |
| 6,381,228 B1 | 4/2002 | Prieto, Jr. et al. |
| 6,532,220 B1 | 3/2003 | Carneal et al. |
| 6,621,801 B1 | 9/2003 | Wright et al. |
| 6,707,821 B1 * | 3/2004 | Shaffer et al. ............. 370/347 |
| 6,975,601 B2 * | 12/2005 | Connors ................... 370/468 |
| 7,346,080 B2 * | 3/2008 | Klotsche .................. 370/443 |

FOREIGN PATENT DOCUMENTS

EP    1 037 405 A2    9/2000

OTHER PUBLICATIONS

Jiang, Z. et al., "A predictive demand assignment multiple access protocol for Internet access over broadband satellite networks," International Journal of Satellite Communications and Networking, 21 (2003) pp. 451-467.

* cited by examiner

*Primary Examiner*—Ricky Ngo
*Assistant Examiner*—Pao Sinkantarakorn
(74) *Attorney, Agent, or Firm*—Blakely, Sokoloff, Taylor & Zafman LLP

(57) ABSTRACT

Provided are an apparatus for estimating an increment in the number of packets arriving at a transmission queue of each terminal and allocating resources to terminals based on the increment in a Demand Assignment Multiple Access (DAMA) satellite communication system, and a method thereof. The method, includes the steps of: a) comparing a summation of requested time slot quantities of terminals with a total number of available time slots; and b) allocating the time slots as much as the requested time slot quantity to each terminal and allocating remaining time slots additionally in proportion to an estimated increase in the number of packets arriving at a transmission queue of each terminal. The apparatus can raise efficiency of resources allocation in DAMA communications and reduce the packet transmission time in a terminal transmission queue.

7 Claims, 4 Drawing Sheets

APPARATUS FOR ALLOCATING RESOURCES IN DAMA SATELLITE COMMUNICATION SYSTEM AND METHOD THEREOF

FIELD OF THE INVENTION

The present invention relates to an apparatus for allocating resources in a Demand Assignment Multiple Access (DAMA) satellite communication system and a method thereof; and, more particularly, to an apparatus for estimating an increment of the number of packets arriving at a transmission queue of each terminal and allocating resources to each terminal based on the same, and a method thereof.

DESCRIPTION OF RELATED ART

A Geostationary Earth Orbit (GEO) satellite communication system using a Demand Assignment Multiple Access (DAMA) transmits a capacity request (CR) to a scheduler embedded in a central station or a satellite when a terminal requires resources. The scheduler performs capacity allocation (CA) on each terminal based on the received CR. The terminal transmits information through allocated resources. Therefore, delay of a predetermined time can be caused in the GEO satellite communication system using the DAMA since the central station receives the request from the terminal and allocates the resources.

The delay can deteriorate the quality of service (QoS) in communications. To overcome the delay time, the scheduler can use a method for allocating the resources after estimating the required resources quantity. Herein, exact estimation is important.

The estimation-based resources allocating method has diverse patterns, but a conventional technology uses only a method for allocating resources after adding the estimated quantity to the requested quantity transmitted by the terminal. Herein, the estimated quantity means a quantity that remains behind after resources are allocated as much as requested by terminals among total quantity in given frequency resources and additionally allocated through proper estimation. For example, when a total quantity of frequency resources, i.e., time slot quantity, is 20 and a total of 15 time slots are requested for 5 terminals, 5 time slots remain. Herein, the problem is what estimation result should be applied to allocate the remaining 5 time slots to the 5 terminals.

In an article by Zhifeng Jiangy and Victor C. M. Leung, entitled "A predictive demand assignment multiple access protocol for Internet access over broadband satellite networks", *Int. J. Satell. Commun. Network*, Vol. 21, pp. 451-467 the time slot allocation quantity for each terminal is determined as follows.

Each terminal determines the requested time slot quantity based on the number of packets waiting in a buffer of each terminal, i.e., a transmission queue and notifies the quantity to the central station. When the summation of the requested time slot quantities of terminals is larger than the number of available time slots, the central station determines the time slot allocation quantity for each terminal in proportion to the requested time slot quantity. When the summation of the requested time slot quantities of the terminals is smaller than the number of available time slots, the central station allocates the time slots to each terminal as much as the requested time slot quantity and allocates free time slots to the terminals in proportion to an estimated increase in the number of buffers waiting in the transmission queue of each terminal. This can be expressed as Equation 1.

$$A_{t+1}^i = \begin{cases} \dfrac{TN}{\sum_{i \in S} D_t^i} D_t^i & \text{if } \sum_{i \in S} D_t^i \geq TN \\ D_t^i + \dfrac{L_t}{\sum_{i \in S} M_{t+1}^i} M_{t+1}^i & \text{otherwise} \end{cases} \quad \text{Eq. 1}$$

$$M_{t+1}^i = \max\left\{ \dfrac{L_t}{TN}\Delta D_t^i + \left(1 - \dfrac{L_t}{TN}\right)(\Delta D_t^i - \Delta D_{t-1}^i), 0 \right\}$$

$$\Delta D_t^i = D_t^i - D_{t-1}^i$$

where $A_{t+1}^i$ is the number of time slots allocated to a terminal i to be used in a $(t+1)^{th}$ cycle; $D_t^i$ is a requested time slot quantity of the terminal i in a $t^{th}$ cycle; TN is a total number of time slots available in each cycle; $L_t$ is the number of free time slots in the $t^{th}$ cycle; S is a set of terminals; and $M_{t+1}^i$ is an estimated increase in the number of packets waiting in the transmission queue of the terminal i in the $(t+1)^{th}$ cycle.

However, as shown in the Equation 1, the estimation method used in the article of Leung et al. is a convex combination using an increment $(\Delta D_t)$, of a requested quantity and a secondary increment $(\Delta D_t - \Delta D_{t-1})$ of the requested quantity as explanatory variables. All the weights of the convex combination are more than 0, and the convex combination means a weighted summation of a case that the total summation becomes 1. The accuracy of an estimation method depends on what explanatory variable is selected and what functional relation is defined, and the estimation method suggested by Leung et al. has a problem that the exactness is quite low.

SUMMARY OF THE INVENTION

It is, therefore, an object of the present invention to provide an apparatus for estimating increment in the number of packets arriving at a transmission queue of each terminal, and a method thereof.

It is another object of the present invention is to provide an apparatus for efficiently allocating resources of the terminal by using estimated increase in the number of packets arriving at the transmission queue of each terminal, and a method thereof.

In accordance with an aspect of the present invention, there is provided a method for allocating resources in a Demand Assignment Multiple Access (DAMA) satellite communication system, including the steps of: a) comparing a summation of requested time slot quantities of terminals with a total number of available time slots; and b) allocating the time slots as much as the requested time slot quantity to each terminal and allocating remaining time slots additionally in proportion to an estimated increase in the number of packets arriving at a transmission queue of each terminal when the summation of the requested time slot quantities of the terminals is smaller than the total number of the available time slots.

In accordance with another aspect of the present invention, there is provided an apparatus for allocating resources in a Demand Assignment Multiple Access (DAMA) satellite communication system, including: a regression analyzing block for estimating an increment in the number of packets arriving at a transmission queue of each terminal when a summation of requested time slot quantities of terminals is smaller than a total number of the available time slots; and a scheduling block for allocating the time slots as much as the requested time slot quantity to each terminal and additionally allocating time slots in proportion to the estimated increase in the number of packets arriving at the transmission queue of each terminal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In summation, if it is considered that detailed description on the prior art may blur the points of the present invention, the detailed description will not be provided herein. The preferred embodiments of the present invention will be described in detail hereinafter with reference to the attached drawings.

Figure 1:
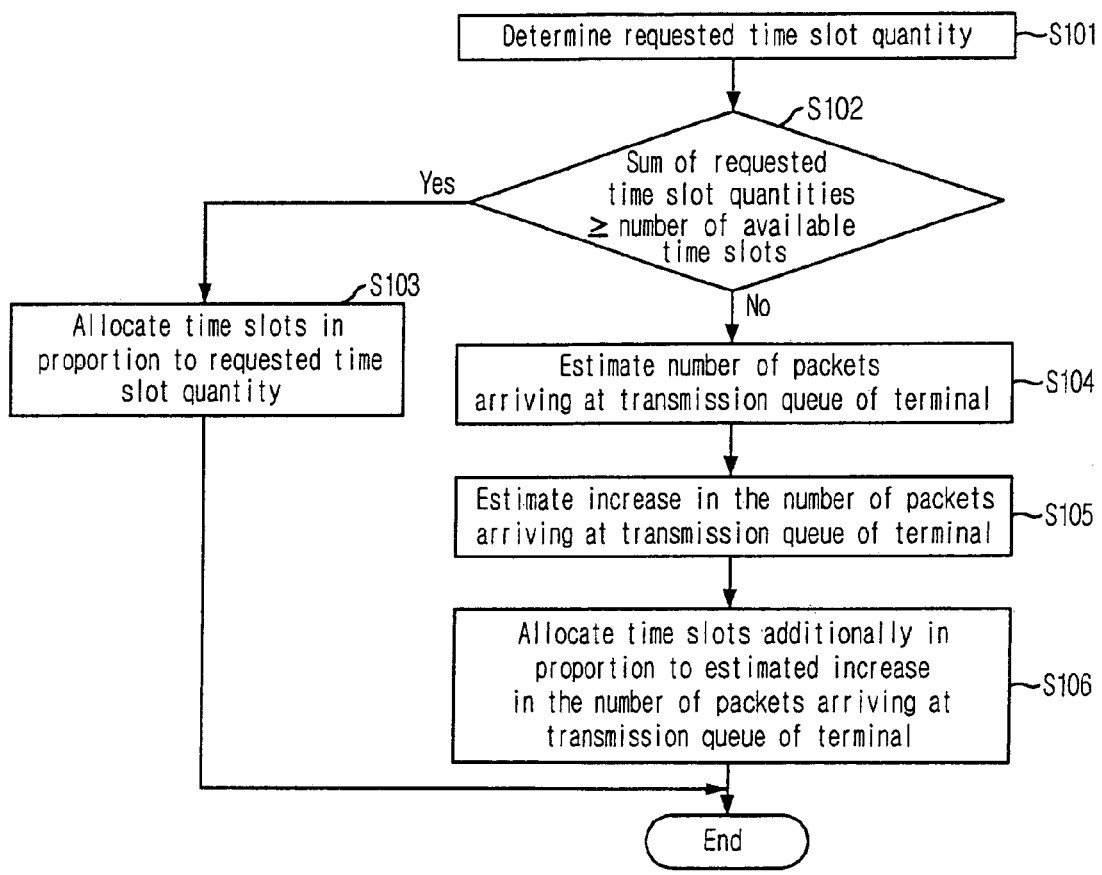
FIG. 1 is a flowchart describing a resources allocation procedure in accordance with an embodiment of the present invention.

FIG. 1 is a flowchart describing a resources allocation procedure in accordance with an embodiment of the present invention.

Each terminal determines its own requested time slot quantity based on the number of buffers of each terminal, i.e., the number of packets waiting in a transmission queue, and notifies the quantity to a central station at step S101. A regression analyzing block of the central station compares the summation of requested time slot quantities of terminals with the number of available time slots at step S102.

When the summation of the requested time slot quantities of each terminal is larger than the available time slot number, a scheduling block of the central station determines time slot allocation quantity of each terminal in proportion to the requested time slot quantity at step S103.

On the contrary, when the summation of the requested time slot quantities of terminals is smaller than the available time slot number, the scheduling block of the central station allocates the time slot to each terminal as much as the requested time slot quantity and allocates free time slots to each terminal in proportion to estimated increase in the number of packets arriving at a transmission queue of each terminal. This is expressed as Equation 2.

$$A_{t+1}^i = \begin{cases} \frac{TN}{\sum_{i \in S} D_t^i} D_t^i & \text{if } \sum_{i \in S} D_t^i \geq TN \\ D_t^i + \frac{L_t}{\sum_{i \in S} M_{t+1}^i} M_{t+1}^i & \text{otherwise} \end{cases} \quad \text{Eq. 2}$$

where $A_{t+1}^i$ is the number of time slots allocated to a terminal i to be used in a $(t+1)^{th}$ cycle; $D_t^i$ is requested time slot quantity of the terminal i in a $t^{th}$ cycle; TN is a total number of time slots available in each cycle; $L_t$ is the number of free time slots in the $t^{th}$ cycle; S is a set of terminals; and $M_{t+1}^i$ is an estimated increase in the number of packets arriving at the transmission queue of the terminal i in the $(t+1)^{th}$ cycle. That is, when the number of the free time slots is 0 as $$\sum_{i \in S} D_t^i \geq TN,$$

the scheduling block determines an allocation quantity $A_{t+1}^i$ for the terminal i of the $(t+1)^{th}$ cycle in proportion to the requested time slot quantity as $$\frac{TN}{\sum_{i \in S} D_t^i} D_t^i.$$

On the contrary, when the number of the free time slots is not 0, the scheduling block determines the allocation quantity $A_{t+1}^i$ for the terminal i in the $(t+1)^{th}$ cycle by summating the requested time slot quantity of the terminal i in the $t^{th}$ cycle and the additional allocation quantity of the free time slots as $$D_t^i + \frac{L_t}{\sum_{i \in S} M_{t+1}^i} M_{t+1}^i.$$

A procedure for acquiring the estimated increase $M_{t+1}^i$ in the number of packets arriving at the transmission queue of the terminal i in the $(t+1)^{th}$ cycle will be described in detail hereinafter.

The estimated increase $M_{t+1}^i$ in the number of packets arriving at the transmission queue of the terminal i in the $(t+1)^{th}$ cycle is acquired by Equation 3.

$$M_{t+1}^i = \max\{\hat{Y}_{t+1}^i - Y_t^i, 0\} \quad \text{Eq. 3}$$

where $\hat{Y}_{t+1}^i$ is an estimated value of the number of packets arriving at the transmission queue of the terminal i in the $(t+1)^{th}$ cycle; and $Y_t^i$ is the number of packets arriving at the transmission queue of the terminal i in the $t^{th}$ cycle.

Herein, $\hat{Y}_{t+1}^i$ should be estimated to calculate the estimated increase $M_{t+1}^i$ in the number of packets arriving at the transmission queue of the terminal i in the $(t+1)^{th}$ cycle by the Equation 3.

At step S104, the regression analyzing block of the central station estimates $\hat{Y}_{t+1}^i$ by using a method of least squares using that a variance of the estimated quantity becomes the minimum at step S104.

The estimated value $\hat{Y}_{t+1}^i$ of the number of packets arriving at the transmission queue of the terminal i in the $(t+1)^{th}$ cycle is estimated by using a model of Equation 4.

$$\hat{Y}_{t+1} = a + bY_t + c\Delta Y_t + d(\Delta Y_t - \Delta Y_{t-1})$$

$$(\text{단}, \Delta Y_t = Y_t - Y_{t-1}) \quad \text{Eq. 4}$$

The constants a, b, c and d are acquired by the method of least squares. In the method of least squares, the constants a, b, c and d are determined in such a manner that the summation of a square of a residual $(E_t = Y_t - \hat{Y}_t)$ is the minimum.

Figure 2:
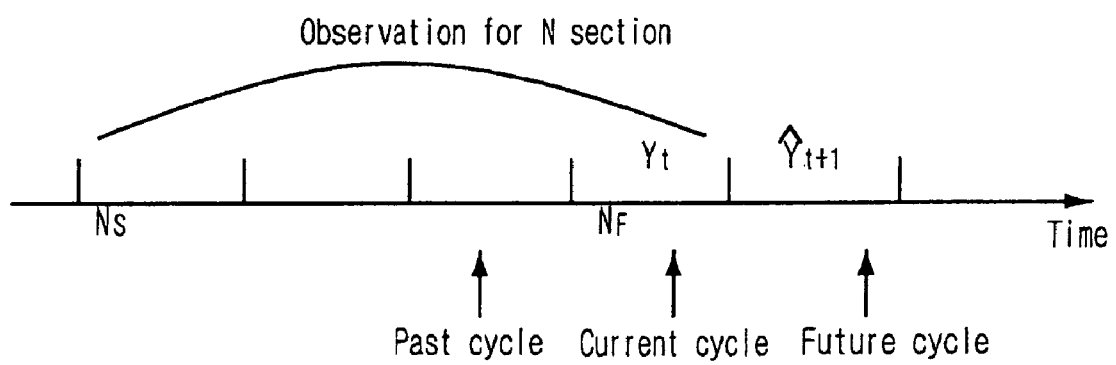
FIG. 2 is a diagram showing observation time and prediction time of a packet in accordance with an embodiment of the present invention.

As shown in FIG. 2, the estimated value $\hat{Y}_{t+1}^i$ of the number of packets arriving at the transmission queue of the terminal i in the $(t+1)^{th}$ cycle is calculated by using a time window of which a start cycle is $N_s$ and a final cycle is $N_f$. That is, the constants a, b, c and d are determined to minimize the Equation 5 during a time window cycle $N_s$ to $N_f$.

$$\sum_{t=N_s}^{N_l} E_t^2 = \sum_{t=N_s}^{N_l} (Y_t - \hat{Y}_t)^2$$

$$= \sum_{t=N_s}^{N_l} (Y_t - a - bY_{t-1} - c\Delta Y_{t-1}d(\Delta Y_{t-1} - \Delta Y_{t-2}))^2$$

Eq. 5 where $$\sum_{t=N_s}^{N_l} E_t^2$$

is minimized when a value obtained by partially differentiating $$\sum_{t=N_s}^{N_l} E_t^2$$

each of the constants a, b, c and d, is 0. Therefore, the constants a, b, c and d minimizing $$\sum_{t=N_s}^{N_l} E_t^2$$

can be acquired by calculating simultaneous Equations of the Equation 6.

The estimated value $\hat{Y}_{t+1}^i$ of the number of packets arriving at the transmission queue of the terminal i in the $(t+1)^{th}$ cycle can be acquired by substituting the constants a, b, c and d acquired in the Equation 6 for the Equation 4.

At step S105, the scheduling block of the central station can acquire the estimated increase $M_{t+1}^i$ in the number of packets arriving at the transmission queue of the terminal i in the $(t+1)^{th}$ cycle by applying the estimated value $\hat{Y}_{t+1}^i$ of the number of packets arriving at the transmission queue of the terminal i in the $(t+1)^{th}$ cycle, which was acquired in the regression analyzing block, to the Equation 3.

At step S106, an allocation quantity $A_{t+1}^i$ for the terminal i in the $(t+1)^{th}$ cycle of a case in which free time slots exist can be determined by applying the estimated increase $M_{t+1}^i$ of the number of packets arriving at the transmission queue of the terminal i in the $(t+1)^{th}$ cycle to the Equation 2.

An experiment is performed under the condition shown in Table 1 in order to figure out the advantages of the present invention over the conventional method suggested by Leung et al when the time slot allocation quantity to each terminal is determined based on the present invention.

TABLE 1

| | |
|---|---|
| Number of terminals | 100 |
| Number of available time slots per super frame (cycle) | 2,000 |
| Cycle time | 0.27 second |
| Arriving distribution   Location parameter k | 0.6 |
| Pareto distribution   Shape parameter ∝ | 1.2 |
| MFRP (packet number distribution: index distribution) | 40, 60 |
| Traffic generation entity number (SN) | 6, 8, 10, 12 (MFRP = 40) 4, 5, 6, 7, 8 (MFRP = 60) |
| $N_s$ | 3 |
| Number of Time window cycles | 50 |

Figure 3A:
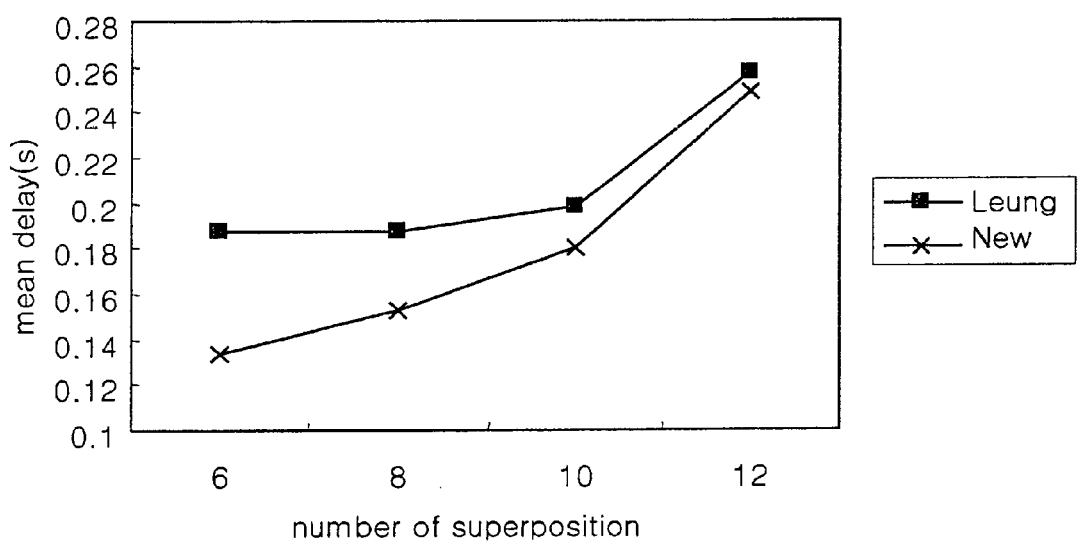
FIG. 3A is a graph showing a relationship between a total number of entities generating traffic, i.e., the number of superposition (SN) and a mean delay when Mean Fractal Renewal Process (MFRP) is 40 under the condition of table 1.

FIG. 3A is a graph showing a relationship between a total number of entities generating traffic, i.e., the number of superposition (SN) and a mean delay when Mean Fractal Renewal Process (MFRP) is 40 under the condition of the $$Ax = h$$

Eq. 6

$$A = \begin{bmatrix} N & \sum Y_{t-1} & \sum \Delta Y_{t-1} & \sum(\Delta Y_{t-1} - \Delta Y_{t-2}) \\ \sum Y_{t-1} & \sum Y_{t-1}^2 & \sum Y_{t-1}\Delta Y_{t-1} & \sum Y_{t-1}(\Delta Y_{t-1} - \Delta Y_{t-2}) \\ \sum \Delta Y_{t-1} & \sum Y_{t-1}\Delta Y_{t-1} & \sum \Delta Y_{t-1}^2 & \sum \Delta Y_{t-1}(\Delta Y_{t-1} - \Delta Y_{t-2}) \\ \sum(\Delta Y_{t-1} - \Delta Y_{t-2}) & \sum Y_{t-1}(\Delta Y_{t-1} - \Delta Y_{t-2}) & \sum \Delta Y_{t-1}(\Delta Y_{t-1} - \Delta Y_{t-2}) & \sum(\Delta Y_{t-1} - \Delta Y_{t-2})^2 \end{bmatrix}$$

$$x = \begin{bmatrix} a \\ b \\ c \\ d \end{bmatrix}$$

$$h = \begin{bmatrix} \sum Y_t \\ \sum Y_t Y_{t-1} \\ \sum Y_t \Delta Y_{t-1} \\ \sum Y_t(\Delta Y_{t-1} - \Delta Y_{t-2}) \end{bmatrix}$$

where $$N = N_f - N_s.$$

Figure 3B:
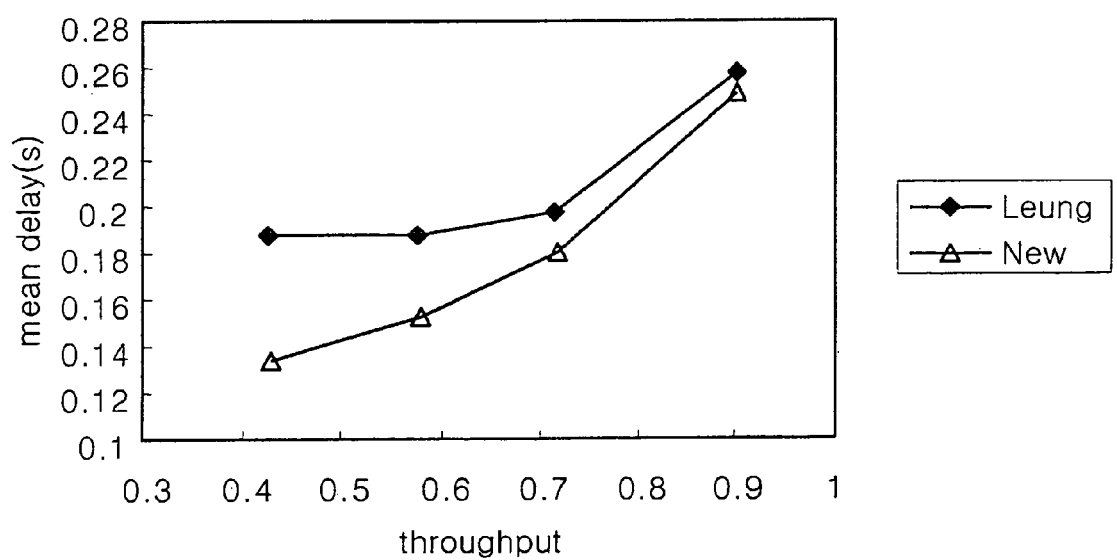
FIG. 3B is a graph showing a relationship between a throughput and the mean delay when the MFRP is 40 under the condition of the table 1.

Table 1. FIG. 3B is a graph showing a relationship between a throughput and the mean delay when the MFRP is 40 under the condition of the table 1. Herein, the throughput is a ratio of actually used packets to the number of allocated packets.

As shown in FIG. 3A, when time slots are allocated to terminals according to the present invention and a total summation of the number of entities generating traffic is small enough, the mean delay can remarkably decrease in comparison with the conventional method of Leung et al. It means that the packet transmission time in a terminal transmission queue decreases, and shows that limited resources are allocated to the terminal based on exactly estimated quantity. As shown in FIG. 3B, when time slots are allocated to terminals according to the present invention and the throughput is small, the mean delay can remarkably decreases in comparison with the conventional method of Leung et al. Meanwhile, the throughput satisfying the same mean delay of the present invention is considerably large in comparison with the conventional method of Leung et al. For example, when the mean delay time is 0.19, the throughput of the present invention is about 0.73, but the throughput of the conventional method of Leung is only 0.65. This shows that the technology of the present invention can allocate the limited resources to the terminals more exactly to the estimated quantity than the conventional method.

Figure 4A:
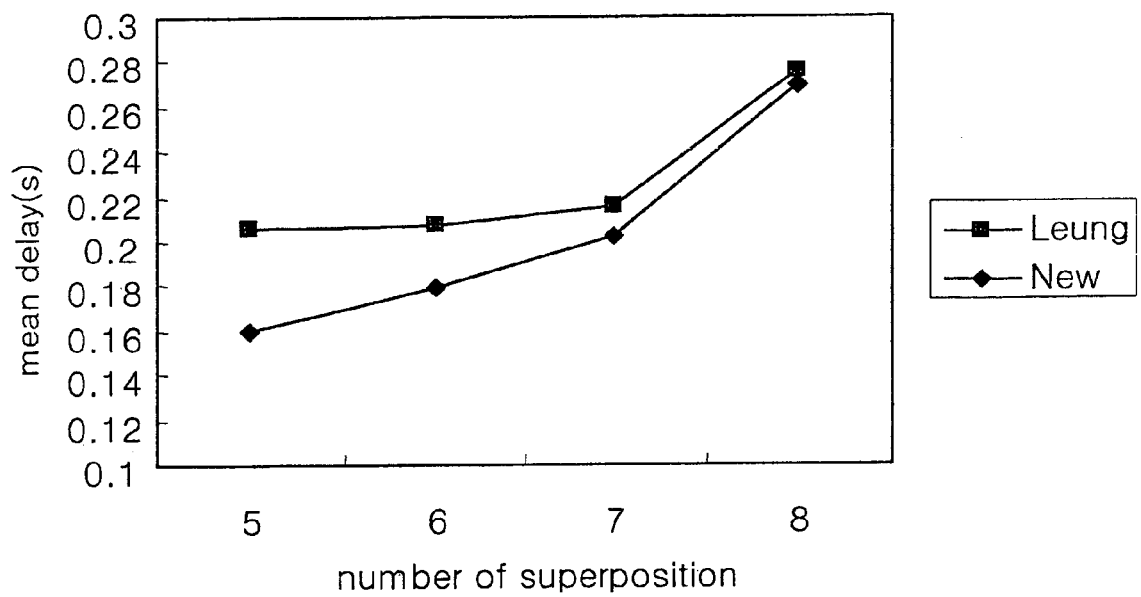
FIG. 4A is a graph showing the relationship between the SN and the mean delay under the condition of the table 1 when the MFRP is 60.
Figure 4B:
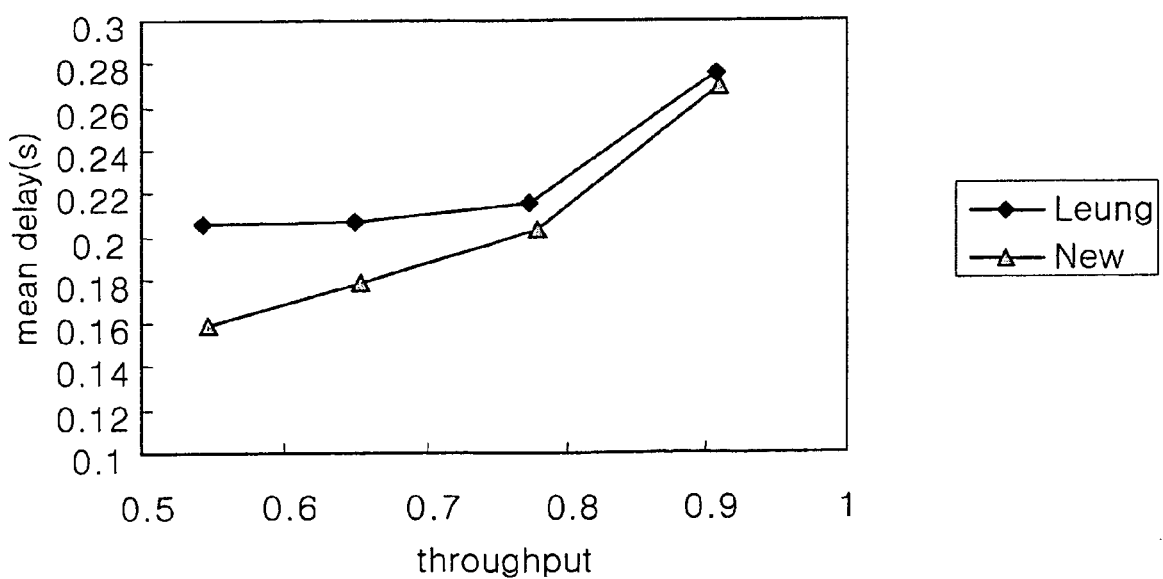
FIG. 4B is a graph showing the relationship between the throughput and the mean delay under the condition of the table 1 when the MFRP is 60.

FIG. 4A is a graph showing the relationship between the SN and the mean delay under the condition of the Table 1 when the MFRP is 60. FIG. 4B is a graph showing the relationship between the throughput and the mean delay under the condition of the table 1 when the MFRP is 60.

As shown in FIG. 4A, when time slots are allocated to each terminal in the method suggested in the present invention in case that the mean packet number increases, the mean delay can be shorten remarkably in comparison with the conventional method by Leung et al. in case that the SN is small.

As shown in FIG. 4B, when time slots are allocated to the terminals in the method of the present invention in case that the mean packet number increases, the mean delay can be shorten remarkably, too, in comparison with the conventional method of Leung et al. in case that the throughput is small enough. Meanwhile, the throughput of the present invention satisfying the same mean delay is considerably large in comparison with the conventional method of Leung et al.

It shows that the present invention can allocate the limited resources to the terminals based on more exactly estimated quantity although the mean packet number increases.

As described above in detail, the present invention can be embodied as a program and stored in a computer-readable recording medium. Since the process can be easily implemented by those skilled in the art, further description will not be provided herein.

The present invention can be used in a non-stop orbit satellite communication system using a Demand Assignment Multiple Access (DAMA) as well as a Geostationary Earth Orbit (GEO) satellite communication system using the DAMA. Although it is described above that the regression analyzing block and the scheduling block are embodied in the central station, it is apparent that the regression analyzing block and the scheduling block can be embodied in a satellite.

The present invention can raise the efficiency of resources allocation based on DAMA communications by using a new explanatory variable, i.e., traffic arriving quantity and an increment of the traffic arriving quantity, and applying the method of least square. Also, the present invention can reduce the packet transmission time in the terminal transmission queue.

The present application contains subject matter related to Korean patent application Nos. 2004-0107990 and 2005-052243 filed with the Korean Intellectual Property Office on Dec. 17, 2004, and Jun. 17, 2005, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for allocating resources in a Demand Assignment Multiple Access (DAMA) satellite communication system, comprising the steps of:
   a) comparing a summation of requested time slot quantities of terminals with a total number of available time slots; and
   b) allocating the available time slots as much as the requested time slot quantity to each terminal and allocating remaining available time slots additionally in proportion to an estimated increase in the number of packets arriving at a transmission queue of each terminal when the summation of the requested time slot quantities of the terminals is smaller than the total number of the available time slots,
   wherein the estimated increase in the number of packets arriving at the transmission queue of each terminal in a $(t+1)^{th}$ cycle is acquired by subtracting an estimated value of the number of packets arriving at the transmission queue of each terminal in the $(t+1)^{th}$ cycle from the number of packets arriving at the transmission queue of each terminal in a $t^{th}$ cycle,
   wherein the estimated value of the number of packets arriving at the transmission queue of each terminal in the $(t+1)^{th}$ cycle is acquired from the number of packets arriving at the transmission queue of each terminal in the $t^{th}$ cycle and the number of packets arriving at the transmission queue of each terminal before the $t^{th}$ cycle.

2. The method as recited in claim 1, further comprising:
   c) allocating the time slots to each terminal in proportion to the requested time slot quantity when the summation of the requested time slot quantity of each terminal is larger than the total number of the available time slots.

3. The method as recited in claim 1, wherein the estimated value of the number of packets arriving at the transmission queue of each terminal in the $(t+1)^{th}$ cycle is acquired by a method of least squares.

4. An apparatus for allocating resources in a Demand Assignment Multiple Access (DAMA) satellite communication system, comprising:
   a regression analyzing means for estimating an increment in the number of packets arriving at a transmission queue of each terminal when a summation of requested time slot quantities of terminals is smaller than a total number of available time slots; and
   a scheduling means for allocating the available time slots as much as the requested time slot quantity to each terminal and additionally allocating available time slots in proportion to the estimated increase in the number of packets arriving at the transmission queue of each terminal,
   wherein the regression analyzing means acquires the estimated increase in the number of packets arriving at the transmission queue of each terminal in a $(t+1)^{th}$ cycle from the estimated number of packets arriving at the transmission queue of each terminal in the $(t+1)^{th}$ cycle, and acquires the estimated the number of packets arriving at the transmission queue of each terminal in the $(t+1)^{th}$ cycle by performing a method of least squares based on the number of packets arriving at the transmission queue of each terminal in a $t^{th}$ cycle and the number of packets arriving at the transmission queue of each terminal before the $t^{th}$ cycle.

5. The apparatus as recited in claim 4, which is realized in a central station.

6. The apparatus as recited in claim 4, which is realized in a satellite.

7. The apparatus as recited in claim 4, wherein the scheduling means allocates the time slots in proportion to a requested time slot quantity of each terminal when the summation of the requested time slot quantity of each terminal is larger than the total number of available time slots.

\* \* \* \* \*